July 13, 1954
A. WRIGHT
2,683,834
CATHODE-RAY TUBE FOR COLOR TELEVISION RECEIVERS
Filed Oct. 7, 1950
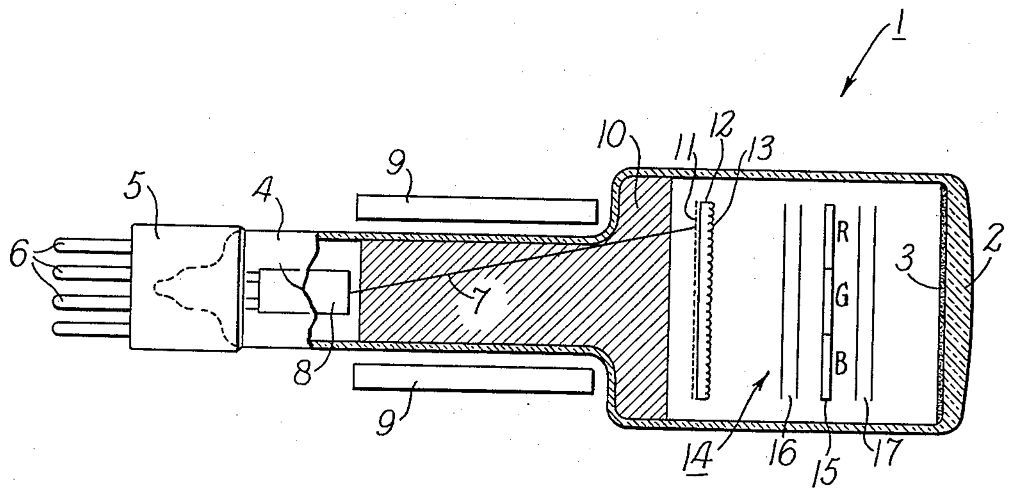
INVENTOR
Arthur Wright Patented July 13, 1954

2,683,834

UNITED STATES PATENT OFFICE 2,683,834

CATHODE-RAY TUBE FOR COLOR TELEVISION RECEIVERS

Arthur Wright, Forest Hills, N. Y.

Application October 7, 1950, Serial No. 188,906

10 Claims. (Cl. 313—92)

My invention relates to television receivers and especially television picture tube, etc., in which the images may be viewed, in colors or in black and white.

An object of my invention is to provide a television receiver in which color images may be effectively received and reproduced visually. Another object is to render multicolor or black and white images available for the observer on a single receiver tube image, and so that the different color components thereof will be simultaneously exhibited thereon, thus avoiding the necessity of interposing selective viewing devices, scanning wheels, shutters and other moving parts. Further objects of my invention will be seen from the detailed description thereof hereinafter.

While my invention is capable of embodiment in various different forms, I have shown, by way of illustration, only one form thereof hereinafter, in the accompanying drawings, in which the figure is a diagrammatic cross-section of a television receiver tube made in accordance with my invention.

In the drawings, I have shown a glass envelope 1 or tube having a cylindrical enlarged front portion provided with an approximately flat front wall 2, which may be thickened to provide added strength to the tube, the front or rear face of which may be provided with a ground glass viewing-screen surface 3 made with emery grinding or otherwise, as desired. The tube has a narrow rear neck portion 4 ending in the usual insulating cylinder 5 carrying any desired electrical connections and terminals for producing a scanning beam 7, in the usual way, from an electron gun 8 operated by the usual deflecting coils 9, the tube being provided on the inner wall thereof with a metallic electron-collecting coating. The electrical circuits and operation of the tube may be of the usual design and construction, for instance as set forth in Fink, Principles of Television Engineering, 1949, and particularly pages 16, 20, 341, 465 thereof, or Grob, Basic Television, 1949, or Terman, Radio Engineering, 1947, all published by the McGraw-Hill Book Co. Inc., New York, N. Y.

The component color signals forming the electron scanning beam 7 may be from any series of signals produced in any camera tube, corresponding to the color components received, by scanning with an electron beam a lenticulated photo-cathode plate, as for instance in the patent to De Vore No. 2,479,820, August 23, 1949, upon Color Television System, or in accordance with any similar system utilizing a lenticulated light receiving plate for separating the received light image into its component colors by the lenticles on said plate, which are spherical or linear, cylindrical lenticulations located at any desired angle, as for instance horizontally or vertically, for maknig a plural-color light separation for the multicolor image, for instance green, red and blue.

The signals thus received are transmitted by the electrons of the scanning beam 7 to a luminescent coating 11 of any desired phosphor, but preferably such as to produce a substantially white light, carried by a thin glass plate 12 provided on the front face with lenticulations 13 which correspond in shape and position, as well as angularity, to the lenticles on the lenticulated plate in the camera tube, hereinabove referred to. The lenticles 13 focus at the rear face of the glass plate 12 and have a diameter about one third of the plate thickness. The lenticle width may be of any desired size. For example, it may be the same size as the lenticles in the camera tube, or 5 to 30 per mm., or larger or smaller. It will be understood, also, that the operation and movement of the scanning beam will be synchronized in time, distance and direction with the movement of the scanning beam in the camera tube, although the direction of movement of the two scanning beams may or may not be parallel to the direction of the linear lenticulations in the camera tube and picture tube. Of course, the lenticulated plates in the camera tube and picture tube may have the same actual size if the lenticulated images in the picture tube and camera tube are to have the same size, but if the said plates and their lenticles are of different sizes, the movement of the scanning beam 7, as to time and distance, will be changed proportionately to accord therewith, to produce larger or smaller images.

Light synchronized as to time and place is thus produced by the phosphor 11 and is thence transmitted through the respective lenticles 13 in the same way, but reversely, as the light was received and divided into two, three or more color components by the usual color filter associated with the lenticular optical system associated with the camera tube. These light components, corresponding to the individual colors from each of the lenticles 13, pass at the respective angles, caused by the curvature of each lenticle, through an optical system 14 of any desired kind and through a multizone color filter 15, for instance red, green and blue, associated with said optical system, within the picture tube, positioned as to the said colors in the same sequence as in the case of the multizone color filter associated with the camera tube lenticular plate aforesaid. The optical system 14 thus focuses the image in its reproduced multicolor components, in the same arrangement as they were received by the camera tube, onto the screen for viewing 3, where the image can be viewed by direct vision in the same natural colors received by the camera tube. This is accomplished in my invention by a single image area in a single color television receiving tube and without having recourse to any moving parts. The image produced on the phosphor 11 may be of the same size as the electron image on the plate 12, or it may be larger or smaller, as desired, according to the kind of objective 14 that is used.

The objective 14 may, for example, be as shown and described in the patent to Oswald No. 1,874,601, August 30, 1932, upon Process of Reproducing Films, in any of its figures thereof, as for instance an objective 16, 17 of the double type, as in Fig. 2 thereof when the images on the phosphor 11 and the ground glass surface 3 are of equal size. But, if the image to be produced on the ground glass surface 3 is an enlargement, an objective such as in Fig. 3 thereof may be used, which is of the double compound type consisting of the two optical parts 16 and 17, the ratio of the focal lengths of which is equal to the desired enlargement. The objective 14, furthermore, as disclosed in the location of the said objective of Oswald Patent No. 1,874,601, for example, has the two principal planes 16 for one optical part of the objective and two principal planes 17 for another optical part of the objective, the said two optical parts being disposed symmetrically on opposite sides of the diaphragm color filter 15, which is located at the common rear focal point of the two optical parts. The lenticles 13 and the ground glass 3 are disposed at the corresponding front focussing points of said optical parts respectively, which are at the two anti-principal planes of the optical assembly 16, 17 and 15. Thus, at the ground glass 3 there is formed an image received from the lenticulated plate 12, the lenticles 13 of which focus at the rear of the glass plate 12. Or, I may use, instead, an objective with a color filter in the tube, such as shown in the French patent to Pathe No. 472,954, Del. August 28, 1914, Fig. 3, or the objective shown in the French patent to Societe Civile No. 632,405, Del. October 4, 1927. It will be understood, of course, that the said objectives may be collimated, or I may use other collimated objectives, as shown for example in patent to Oswald No. 1,825,122, September 29, 1931, upon Objective for Color Photography, or Kitroser et al. No. 1,941,696, January 2, 1934, upon Photographic Objective, or Kitroser No. 1,897,262, February 14, 1933, upon Cinematographic Objective, or an objective with color filter similar to and having the optical properties of the camera tube objective and color filter.

These objectives, for instance the objectives such as those in Fig. 2 of the patent to Oswald No. 1,874,601, referring to "Keller-Dorian films" (also in Pathe (Fr.) No. 472,954, Fig. 1), operate in accordance with the well known apparatus of the amateur color lenticular films as in the lenticular Keller-Dorian or Keller-Dorian-Berthon process.

While I have described my invention above in detail it is to be understood that many changes may be made therein without departing from the spirit thereof.

I claim:

1. A television receiver tube having an optical image-forming objective comprising two optical parts within the tube, a fluorescent area, a lenticular surface, a color filter located between said optical parts, and an image area so located as to exhibit by an image located at said tube a picture in components of different colors simultaneously on the same image area, said area and lenticulated surface being located, respectively, in two antiprincipal planes of said objective.

2. A television receiver tube having an optical image-forming objective comprising two optical parts within the tube, a color filter located between said optical parts, and an image area so located as to exhibit by an image located at said tube a picture in components of different colors simultaneously on the same image area by means of electrical impulses transmitted by an electron beam in the tube and a lenticulated plate carrying a phosphor to receive the electron beam, said image area and lenticulated plate being located, respectively, in two antiprincipal planes of said objective.

3. A television receiver tube having an image area so located as to exhibit by an image located at said tube a picture in components of different colors simultaneously on the same image area by means of electrical impulses transmitted by an electron beam in the tube, a lenticulated plate carrying a phosphor to receive the electron beam, and an image-forming objective, comprising two optical parts, with a color filter located between said optical parts in the tube to receive the light from the phosphor, said image area and lenticulated plate being located, respectively, in two antiprincipal planes of said objective.

4. A television receiver tube having an image area so located as to exhibit by an image located at said tube a picture in components of different colors simultaneously on the same image area by means of electrical impulses transmitted by an electron beam in the tube, a lenticulated plate carrying a phosphor to receive the electron beam, and an image-forming objective, comprising two optical parts, with a color filter located between said optical parts in the tube to receive the light from the phosphor, said image area and lenticulated plate being located, respectively, in two antiprincipal planes of said objective, said tube having a viewing screen forming a part of the tube.

5. A television receiver tube having an image area so located as to exhibit by an image located at said tube a picture in components of different colors simultaneously on the same image area by means of electrical impulses transmitted by an electron beam in the tube, a lenticulated plate carrying a phosphor to receive the electron beam, and an image-forming objective, comprising two optical parts, with a color filter located between said optical parts in the tube to receive the light from the phosphor, said image area and lenticulated plate being located, respectively, in two antiprincipal planes of said objective, said tube having a viewing screen forming a part of the tube wall.

6. A television receiver tube having an optical image-forming objective comprising two optical parts within the tube, a fluorescent area, a lenticular surface, a color filter located between said optical parts, and an image area in the tube so located as to exhibit by an image located at said tube a picture in components of different colors simultaneously on the same image area, said image area and lenticulated surface being located, respectively, in two antiprincipal planes of said objective.

7. A television receiver tube having an optical image-forming objective, comprising two optical parts within the tube, a color filter located between said optical parts and an image area in the tube so located as to exhibit by an image located at said tube a picture in components of different colors simultaneously on the same image area by means of electrical impulses transmitted by an electron beam in the tube, and a lenticulated plate carrying a phosphor to receive the electron beam, said image area and lenticulated surface being located, respectively, in two antiprincipal planes of said objective.

8. A television receiver tube having an image area in the tube so located as to exhibit by an image located at said tube a picture in components of different colors simultaneously on the same image area by means of electrical impulses transmitted by an electron beam in the tube, a lenticulated plate carrying a phosphor to receive the electron beam, and an image-forming objective, comprising two optical parts, with a color filter located between said optical parts in the tube to receive the light from the phosphor, said image area and lenticulated plate being located, respectively, in two antiprincipal planes of said objective.

9. A television receiver tube having an image area in the tube so located as to exhibit by an image located at said tube a picture in components of different colors simultaneously on the same image area by means of electrical impulses transmitted by an electron beam in the tube, a lenticulated plate carrying a phosphor to receive the electron beam, and an image-forming objective, comprising two optical parts with a color filter located between said optical parts in the tube to receive the light from the phosphor, said image area and lenticulated plate being located, respectively, in two antiprincipal planes of said objective, said tube having a viewing screen forming a part of the tube.

10. A television receiver tube having an image area in the tube so located as to exhibit by an image located at said tube a picture in components of different colors simultaneously on the same image area by means of electrical impulses transmitted by an electron beam in the tube, a lenticulated plate carrying a phosphor to receive the electron beam, and an image-forming objective, comprising two optical parts with a color filter located between said optical parts in the tube to receive the light from the phosphor, said image area and lenticulated plate being located, respectively, in two antiprincipal planes of said objective, said tube having a viewing screen forming a part of the tube wall.

References Cited in the file of this patent

UNITED STATES PATENTS

| Number | Name | Date |
|---|---|---|
| 2,091,152 | Malpica | Aug. 24, 1937 |
| 2,169,838 | Herbst | Aug. 15, 1939 |
| 2,197,625 | Teves et al. | Apr. 16, 1940 |
| 2,201,245 | Ruska et al. | May 21, 1940 |
| 2,289,978 | Malter | July 14, 1942 |
| 2,310,863 | Leverenz | Feb. 9, 1943 |
| 2,330,172 | Rosenthal | Sept. 21, 1943 |
| 2,382,604 | Capstaff et al. | Aug. 14, 1945 |
| 2,385,770 | Birch-Field | Oct. 2, 1945 |
| 2,479,820 | De Vore | Aug. 23, 1949 |
| 2,485,561 | Burroughs | Oct. 25, 1949 |
| 2,621,247 | Wright | Dec. 9, 1952 |

FOREIGN PATENTS

| Number | Country | Date |
|---|---|---|
| 555,167 | Great Britain | Aug. 6, 1943 |
| 562,334 | Great Britain | June 28, 1944 |